US009610967B2

(12) United States Patent
Dean et al.

(10) Patent No.: US 9,610,967 B2
(45) Date of Patent: Apr. 4, 2017

(54) STEERING WHEEL ASSEMBLY FOR A VEHICLE (71) Applicant: FORD GLOBAL TECHNOLOGIES, LLC, Dearborn, MI (US)

(72) Inventors: Michael Joseph Dean, Westland, MI (US); James Robert Chascsa, Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/610,240

(22) Filed: Jan. 30, 2015

(65) Prior Publication Data
US 2016/0221596 A1   Aug. 4, 2016

(51) Int. Cl.
*B62D 1/06*   (2006.01)
(52) U.S. Cl.
CPC ........................................ *B62D 1/06* (2013.01)
(58) Field of Classification Search
CPC  B62D 1/06; B29L 2031/3047; Y10T 74/2087
See application file for complete search history.

(56) References Cited

U.S. PATENT DOCUMENTS

| 4,010,659 | A | * | 3/1977 | Muller | B62D 1/06 |
| | | | | | 74/552 |
| 5,792,302 | A | * | 8/1998 | Nakada | B29C 44/12 |
| | | | | | 156/293 |
| 6,668,682 | B1 | * | 12/2003 | Emeneth | B29C 66/1142 |
| | | | | | 74/552 |
| 6,668,683 | B2 | | 12/2003 | Fleckenstein | |
| 6,695,942 | B2 | | 2/2004 | Testa | |
| 6,748,822 | B2 | | 6/2004 | Hussy | |
| 6,797,087 | B2 | * | 9/2004 | Hosokawa | B29C 65/0618 |
| | | | | | 156/272.2 |
| 7,111,396 | B2 | | 9/2006 | Liuti et al. | |
| 7,143,663 | B2 | * | 12/2006 | Menaldo | B29C 43/203 |
| | | | | | 264/257 |
| 8,047,097 | B2 | * | 11/2011 | Worrell | B62D 1/06 |
| | | | | | 156/242 |

(Continued)

FOREIGN PATENT DOCUMENTS

| DE | 102010018418 A1 | * | 10/2011 | ......... B29C 65/1603 |
| JP | 3367425 B2 | * | 1/2003 | ............. B29C 65/58 |

OTHER PUBLICATIONS

Machine translation of JP 3367425 B2 obtained on Jan. 28, 2016.*

*Primary Examiner* — Adam D Rogers
(74) *Attorney, Agent, or Firm* — Vichit Chea; King & Schickli, PLLC (57) ABSTRACT A steering wheel assembly includes an armature, and a plurality of exterior shell sections. Each of the exterior shell sections include an inner layer, an intermediate layer, and an outer layer, and have a counterpart or corresponding exterior shell section. The armature may include a hub, a generally U-shaped rim and at least two spokes connecting the hub and the generally U-shaped rim. The first layer of each of the plurality of exterior shell sections includes a protrusion that extends into and conforms to the generally U-shaped rim. Also, the intermediate layer of each of the plurality of exterior shell sections is molded over the inner layer. Each of the plurality of exterior shell sections and its counterpart are interlocking.

5 Claims, 6 Drawing Sheets (56) References Cited

U.S. PATENT DOCUMENTS

| | | | | |
|---|---|---|---|---|
| 8,051,567 B2* | 11/2011 | Kwon | ................... | B29C 44/445 |
| | | | | 29/428 |
| 8,505,410 B2 | 8/2013 | Matsu et al. | | |
| 8,677,858 B2* | 3/2014 | Tajiri | ....................... | B62D 1/06 |
| | | | | 264/449 |
| 8,683,890 B2* | 4/2014 | Nokura | ................... | B62D 1/06 |
| | | | | 74/552 |
| 9,272,467 B2* | 3/2016 | Bieniek | ............. | B29C 45/14467 |
| 2005/0276874 A1* | 12/2005 | Menaldo | ............... | B29C 51/145 |
| | | | | 425/129.1 |
| 2010/0101364 A1* | 4/2010 | Seidl | ........................ | B62D 1/06 |
| | | | | 74/552 |

\* cited by examiner

STEERING WHEEL ASSEMBLY FOR A VEHICLE

TECHNICAL FIELD

This document relates generally to steering wheel assemblies used in vehicles, and more specifically to a steering wheel assembly having multilayered outer sections.

BACKGROUND

Steering wheel assemblies are a common component of vehicles and typically include a metal armature, or core, covered by a resin and an outer covering. The resin is typically a polyurethane resin that is foamed over the entire armature including the rim, spokes, and hub portions. The outer covering represents the visible portion of the steering wheel assembly and may include one or more layers and may be made of various materials. Even more, the one or more outer covering layers may be formed in sections for positioning over the foamed resin layer.

Application of the resin layer in this manner in the manufacturing process typically involves setting the metal armature in a tool and foaming the resin layer over the armature. In this manner, the resin encapsulates the armature and the resulting assembly includes a complete polyurethane resin layer formed over the rim, spokes, and back-cover of the armature. While this method of manufacturing the armature is sufficient in many regards, the method is not optimized.

Due to the size of the steering wheel, the foaming process can have lengthy cycle times and requires extensive trimming of flash, gates, and/or vents. In addition, the molding parameters must be continuously adjusted in order to reduce the amount of scrap material. Even more, the foaming method results in the loss of grain definition in complex areas having low draft angles, and the incorporation of additional slides to address die-lock conditions. Equally important, the completed the steering wheel assembly does not lend itself to serviceability in the field due to its unitary construction.

Accordingly, a need exists for a steering wheel assembly that is serviceable in the field, i.e., the steering wheel assembly is able to be taken apart to repair and/or replace component parts thereof. Even more, the steering wheel assembly should be designed to reduce material scrap rates in the manufacturing process. Such a steering wheel assembly would necessarily include separating the resin and outer layers of the steering wheel rim and spokes into individual sections thus allowing for faster manufacturing, lower scrap rates, and ease of service and partial replacement.

SUMMARY OF THE INVENTION

In accordance with the purposes and benefits described herein, a steering wheel assembly is provided. The steering wheel assembly may be broadly described as comprising an armature having a hub, a rim and at least two spokes connecting said hub and said rim, and first and second shells, each shell having an inner layer interfacing the armature, an intermediate layer molded over the inner layer, and an outer layer covering the intermediate layer.

In one possible embodiment, the first shell inner layer and the second shell inner layer are interlocking. In another, the rim is generally U-shaped, and the first shell inner layer includes a protrusion that extends into the generally U-shaped rim. The first shell inner layer may further include first and second recesses for receiving first and second ends of the generally U-shaped rim.

In another possible embodiment, each of the first and second shells include at least two shell sections. In yet another embodiment, the first shell includes first and second rim sections and first and second spoke sections, and the second shell includes first and second rim sections and first and second spoke sections. Even more, corresponding first shell and second shell sections may be interlocking.

In still another possible embodiment, the intermediate molded layer is a polyurethane.

In accordance with another aspect of the invention, a steering wheel assembly includes an armature, and a plurality of exterior shell sections. Each of the exterior shell sections include an inner layer, an intermediate layer, and an outer layer, and have a counterpart or corresponding exterior shell section. In this embodiment, the armature may include a hub, a generally U-shaped rim and at least two spokes connecting the hub and the generally U-shaped rim.

In still another possible embodiment, the first layer of each of the plurality of exterior shell sections includes a protrusion that extends into and conforms to the generally U-shaped rim.

In one possible embodiment, the inner layer of each of the plurality of exterior shell sections interface the armature in a rigid manner. In another possible embodiment, the intermediate layer of each of the plurality of exterior shell sections is molded over the inner layer of each of the plurality of exterior shell sections.

In yet another possible embodiment, each of the plurality of exterior shell sections and its counterpart are interlocking. In another, the inner layer of each of the plurality of exterior shell sections includes a clip for securing the counterpart exterior shell section.

In other possible embodiments, the steering wheel assemblies described above are incorporated into a vehicle.

In accordance with another aspect, a method of manufacturing a steering wheel assembly is provided. The method may be broadly described as comprising the steps of: (a) forming a plurality of inner layer sections; (b) molding an intermediate layer onto each of the plurality of inner layer sections; (c) covering the intermediate layer of each of the plurality of inner layer sections; and (d) securing each of the plurality of inner layer sections adjacent a corresponding inner layer section of the plurality of inner layer sections, and around an armature.

In another possible method, the armature includes a hub, a rim, and at least two spokes connecting the hub and the rim. In another, the securing step includes interlocking the corresponding inner layer sections together around the armature.

In yet another possible method, the intermediate layer is a polyurethane.

In still another possible method, the securing step includes interlocking the corresponding inner layer sections together around the armature. Even more, the interlocking step may include positioning fasteners along the inner layer to align and lock the inner layer sections together around the armature.

In the following description, there are shown and described several preferred embodiments of the steering wheel assembly and the related methods. As it should be realized, the assemblies and methods are capable of other, different embodiments and their several details are capable of modification in various, obvious aspects all without departing from the assemblies and methods as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the steering wheel assembly and together with the description serve to explain certain principles thereof. In the drawing figures.

Reference will now be made in detail to the present preferred embodiments of the steering wheel assemblies and related methods, examples of which are illustrated in the accompanying drawing figures, wherein like numerals are used to represent like elements.

DETAILED DESCRIPTION

Figure 1:
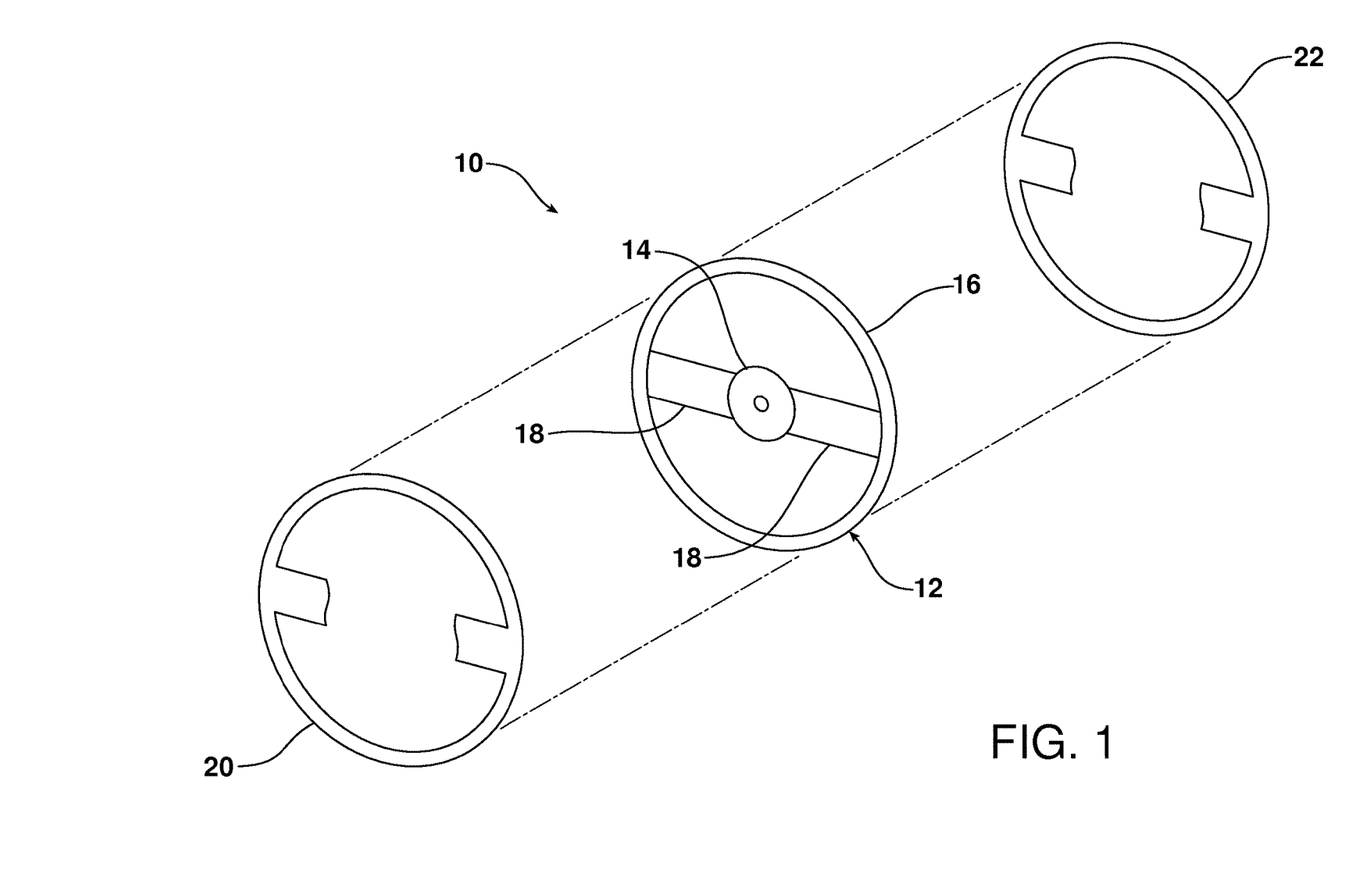
FIG. 1 is an exploding perspective view of a steering wheel assembly including an armature and interlocking shells.

Reference is now made to FIG. 1 which illustrates an exploded view of one embodiment of a steering wheel assembly 10. The steering wheel assembly 10 includes an armature 12 and outer shells 20, 22. The armature 12 is made of metal and is generally U-shaped forming a solid core of the steering wheel assembly 10. The armature 12 includes a central hub 14, an outer rim 16, and a pair of spokes 18 connecting the outer rim to the hub as is known in the art. The number of spokes can be increased depending upon design choice and may include more than two spokes, including partial spokes. The outer shells 20, 22 are secured around the armature 12.

Figure 2:
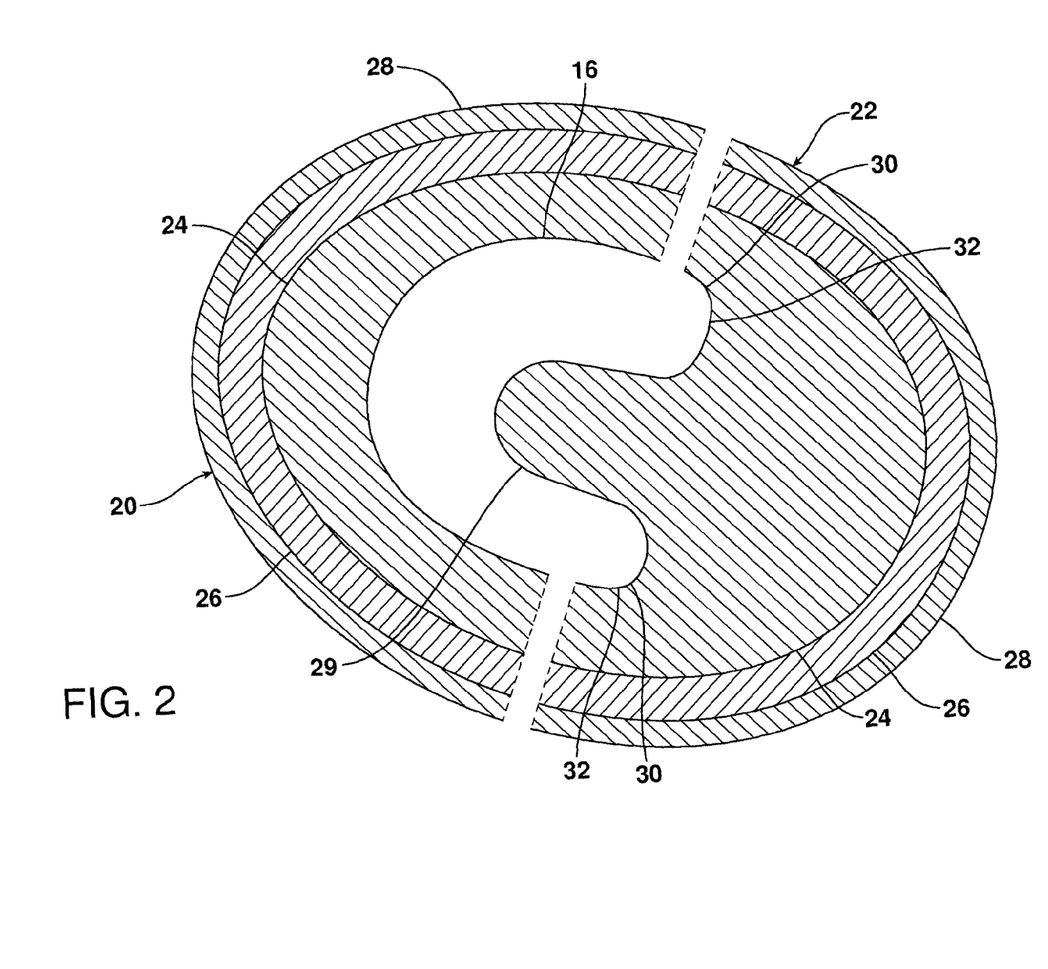
FIG. 2 is a section view of the steering wheel assembly showing the armature and layers of the interlocking shells.

As shown in FIG. 2, each of the outer shells 20, 22 includes an inner layer 24 interfacing the armature 12, an intermediate layer 26 molded over the inner layer, and an outer layer 28 covering the intermediate layer. The inner layers 24 in the described embodiment are fiberboard, plastic, or other laminated materials and may be shaped to conform to the armature 12. In the described embodiment, the outer rim 16 of the armature 12 is shown and is generally U-shaped. In order to interface and conform to the armature 12, the inner layer 24 of shell 22 includes a protrusion 29 that extends into the generally U-shaped outer rim 16. The inner layer 24 of section 22 further includes first and second recesses 30 for receiving first and second ends 32 of the U-shaped outer rim 16. In this manner, a substantially solid core including the outer rim 16 of armature 12 and inner layers 24 is formed.

As noted above, the intermediate layer 26 is molded over the inner layer 24 in each of the outer shells 20, 22. In the described embodiment, the intermediate layer 26 is a molded polyurethane although other moldable materials may be utilized. The outer layer 28 is a wrapperd leather but may be made of polyurethane, wrapped leather, including top grain leather and split hide leather, suede, bonded/synthetic leather, polyurethane foam, sanosprene injection molded materials, thermoplastic olefins (TPO)/thermoplastic elastomers (TPE) injection molded materials, cloth textiles (e.g., cotton, denim, vinyl, nylon, and silk among others) carbon fiber, wood, hydrographic plastic, painted plastic mold-in-color plastic, plated plastic, styrofoam, graphite filled (GF) nylon, polycarbonate injection molded material, rubber based compounds, neoprene, and metal clad (in-mold or crimped) plastic among other materials.

Figure 3:
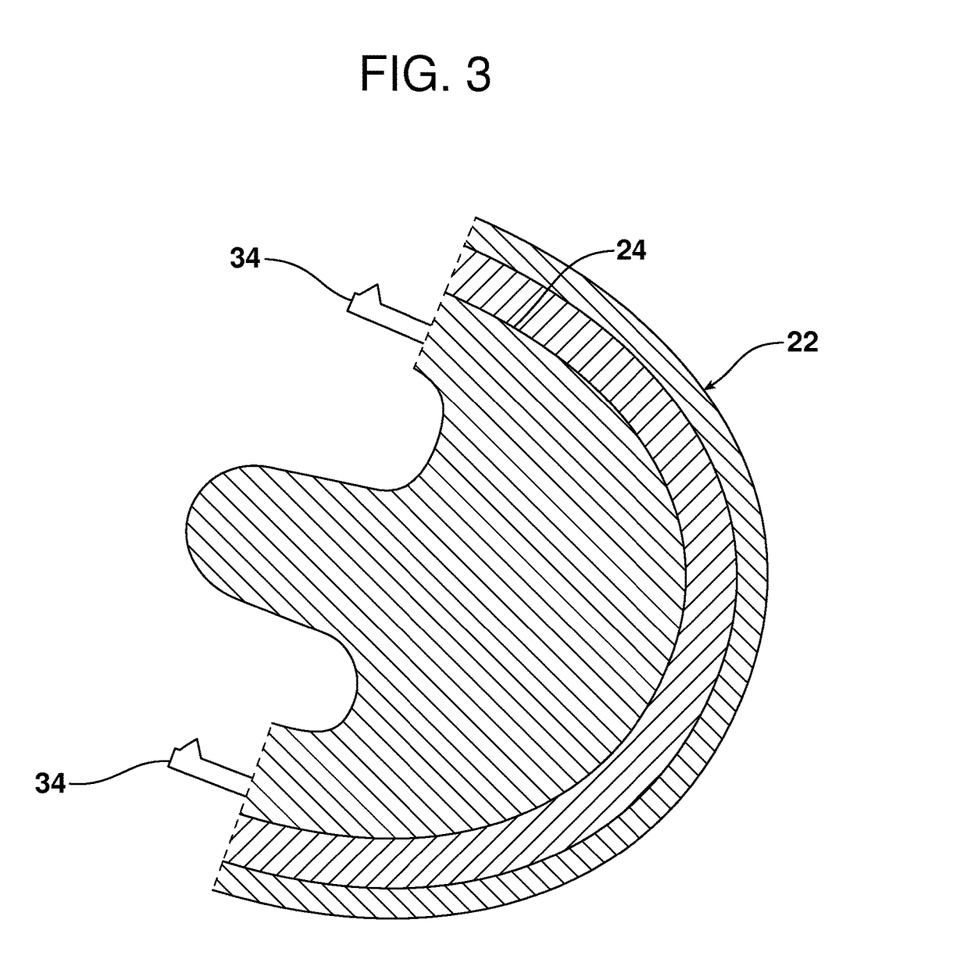
FIG. 3 is a partial section view of the steering wheel assembly showing the clips used to secure the interlocking shells.

The outer shells 20, 22 abut one another in the described embodiment as shown in FIG. 2. The outer shells 20, 22 may be joined together via either an interlocking or over-lapping interface. As shown in FIG. 3, the outer shells 20, 22 are joined together via internal snaps or clips 34. A clip is defined as a device, typically flexible or worked by a spring, for holding an object or objects together or in place. The clips 34 are positioned along an inside edge of inner layer 24 to align and lock the outer shells 20, 22 together. In an alternate embodiment, the outer shells 20, 22 may be joined together via separate ornamentation strips that will interlock them. Of course, different clips or snaps may be used to interlock the outer shells 20, 22

Figure 4:
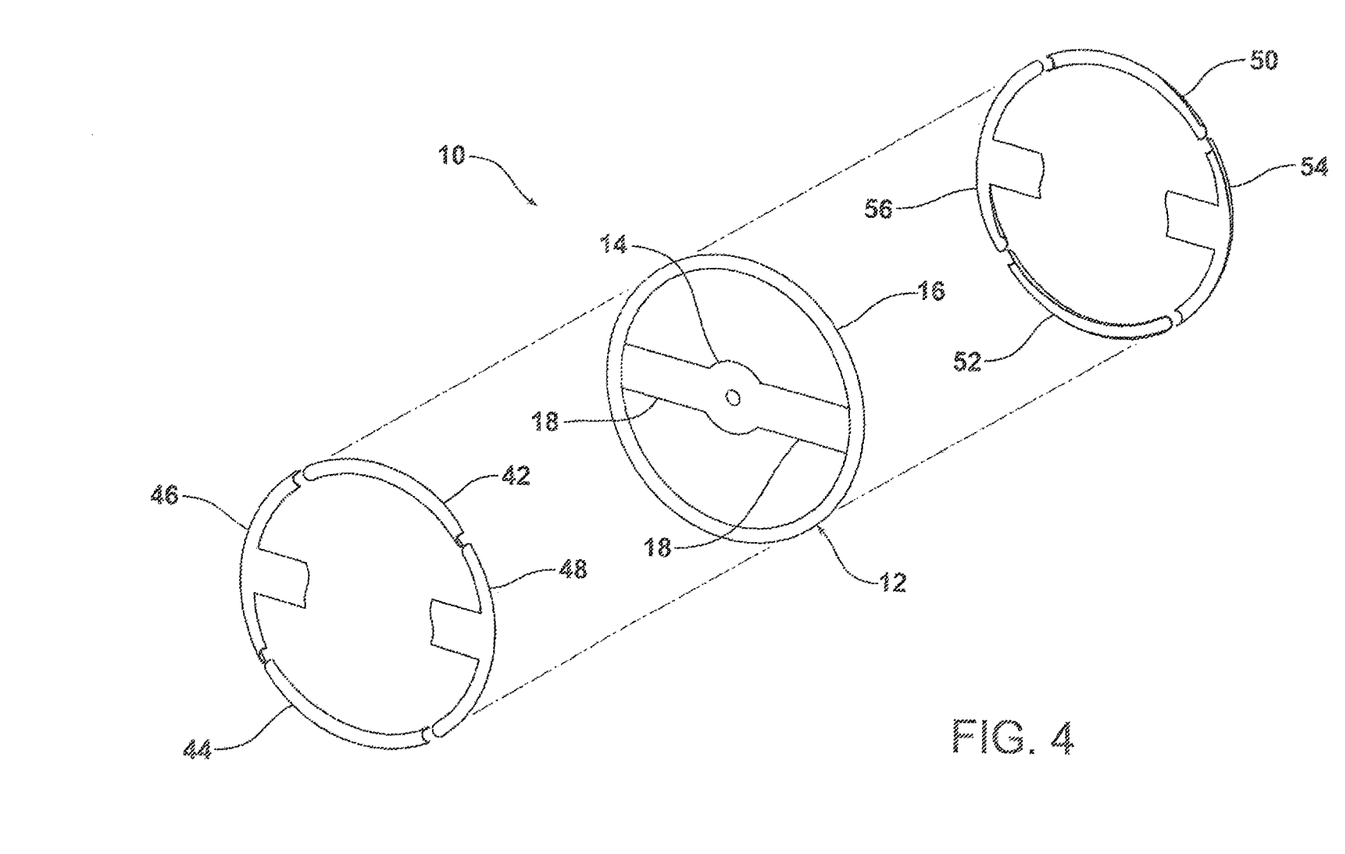
FIG. 4 is an exploding perspective view of an alternate embodiment of a steering wheel assembly including an armature and interlocking sections.

In an alternate embodiment shown in FIG. 4, the outer shells 20, 22 include four independently formed shell sections or exterior shell sections. More or fewer sections could be utilized depending upon the number of spokes utilized in the steering assembly. Specifically, an outer shell includes first and second rim sections 42, 44 and first and second spoke sections 46, 48. Similarly, another outer shell includes first and second rim sections 50, 52 and first and second spoke sections 54, 56. As described above for the outer shells 20 and 22, each section (42, 44, 46, 48, 50, 52, 54, and 56) includes an inner layer 24 interfacing an armature 12, an intermediate layer 26 molded over the inner layer, and an outer layer 28 covering the intermediate layer. The inner layer 24, intermediate layer 26, and outer layer 28 may be made of materials as described for the outer shells 20 and 22.

Even more, corresponding sections abut one another and are joined together via an interlocking or over-lapping interface. In other words, first rim section 42 and corresponding rim section 50 are joined together via internal snaps or clips 34 as described above. The clips 34 are positioned along an inside edge of inner layer 24 similar to that shown in FIG. 3 to align and lock the rim sections 42, 50 together. In alternate embodiments, the rim sections 42 and 50 may be joined together via separate ornamentation strips that will interlock them. Of course, different clips or snaps may be used to interlock each of the sections with their corresponding sections. For clarity, in the described embodiment, rim sections 42 and 50, rim sections 44 and 52, spoke sections 46 and 56, and spoke sections 48 and 54 are corresponding sections.

In another aspect of the invention, a method of manufacturing a steering wheel assembly 10 includes the steps of forming a plurality of inner layer sections, molding an intermediate layer onto each of the plurality of inner layer sections, covering the intermediate layer of each of the plurality of inner layer sections, and securing each of the plurality of inner layer sections adjacent a corresponding inner layer section of the plurality of inner layer sections and an armature. The armature includes a hub, a rim, and at least two spokes connecting the hub and the rim.

Figure 5:
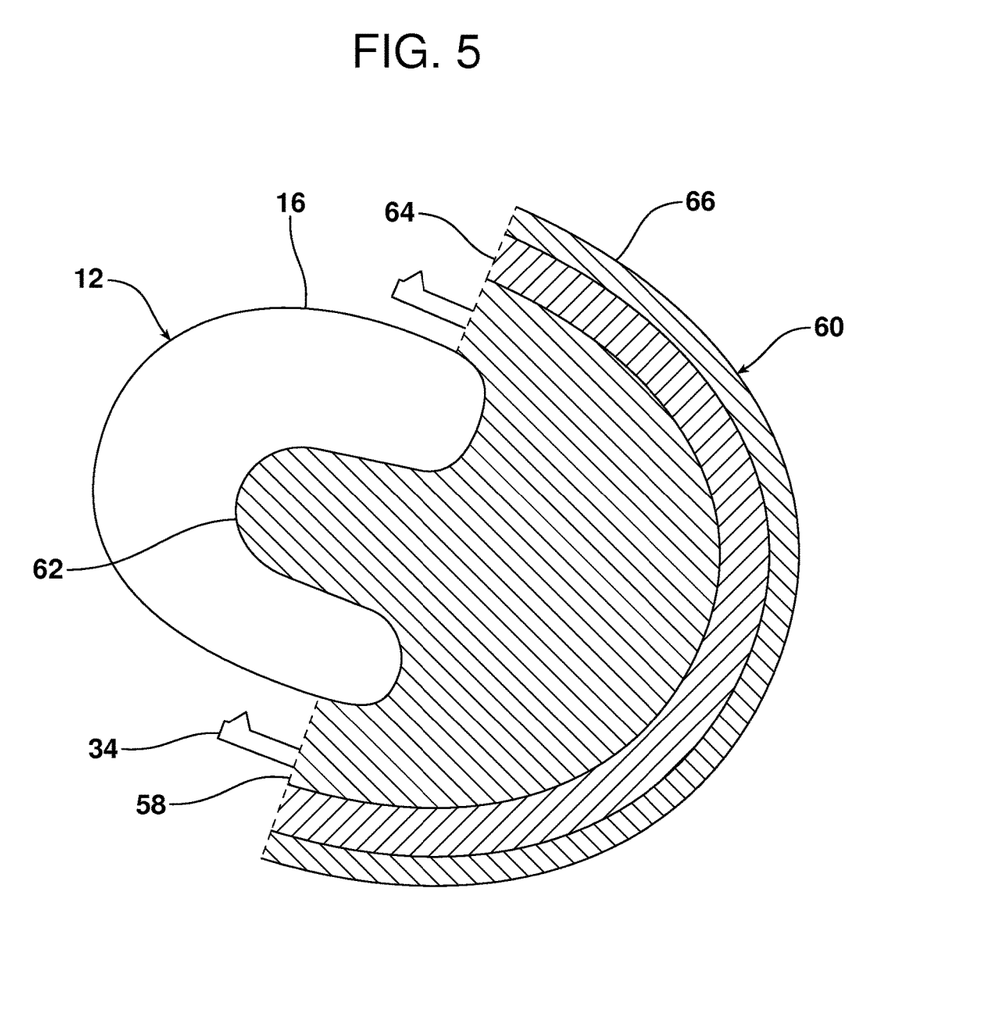
FIG. 5 is a partial section view of the steering wheel assembly illustrating the layers of a rim section of a steering wheel assembly.

In the first step as shown in FIG. 5, an inner layer 58 of a rim section 60 is formed of fiberboard, plastic, or other laminated materials and is shaped to conform to a rim 16 of armature 12, for example. In this embodiment, the rim 16 is generally U-shaped and the inner layer 58 includes a protrusion 62 that will extend into and conform to the generally U-shaped rim upon installation. An intermediate layer 64 of polyurethane is molded over the inner layer 60. The intermediate layer 64 is a molded polyurethane although other moldable materials may be utilized. The molded intermediate layer 64 is then covered. The intermediate layer 64 is covered by a leather wrap 66 in the described embodiment but could be covered with a polyurethane, wood, hydrographic plastic, painted plastic mold-in-color plastic, plated plastic, or a metal clad (in-mold or crimped) plastic among other materials.

Figure 6:
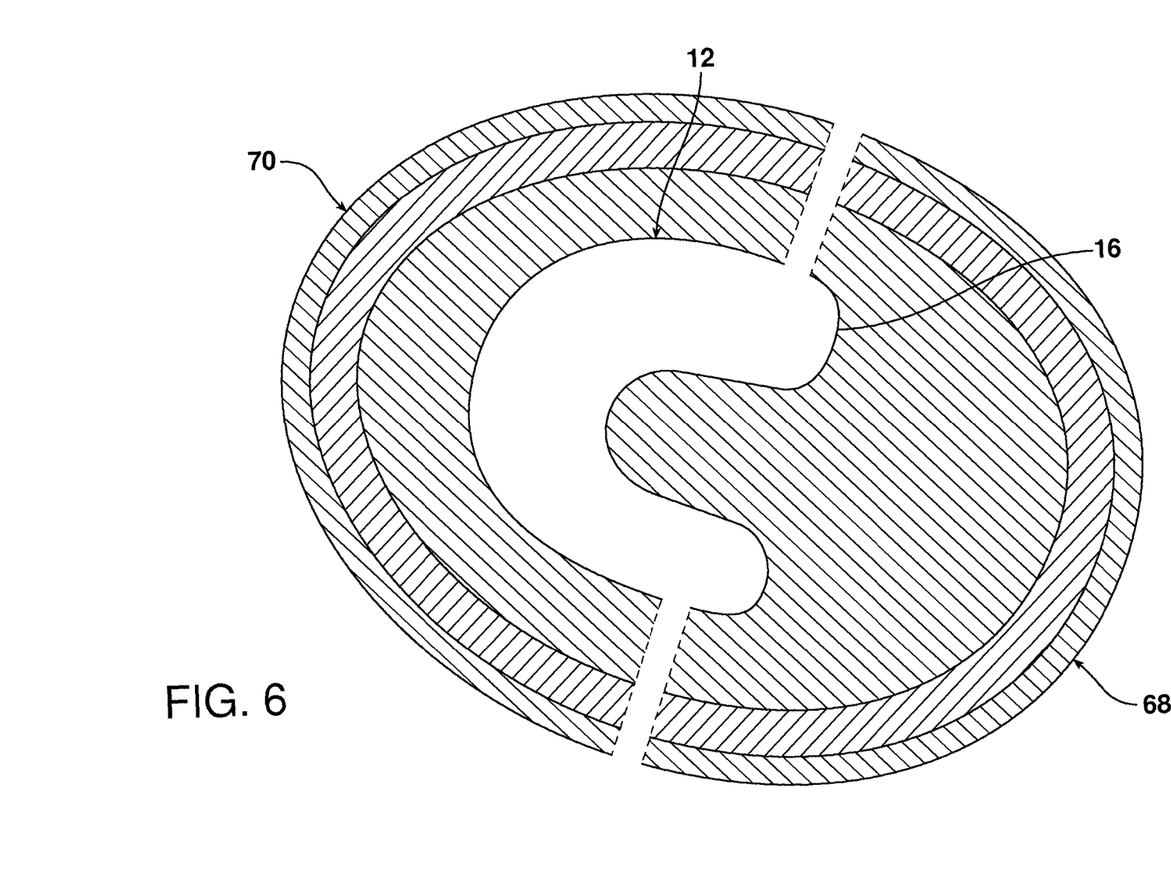
FIG. 6 is a section view of the steering wheel assembly showing interlocking rim sections in a secured positioned around an armature.

In the described method as shown in FIG. 6, the securing step includes interlocking corresponding sections 68, 70 (e.g., rim or spoke sections) together around an armature 12. More specifically, corresponding rim sections 68, 70 would be secured together around rim 16 for example. Similarly, corresponding spoke sections would be secured together around the spokes. As described above and presently shown in FIG. 5, the securing step may also include positioning fasteners 34, for example snaps or clips, along the inner layer 58 to align and lock the inner layer sections together around the armature 12.

In summary, numerous benefits result from a steering wheel assembly 10 as illustrated in this document. The steering wheel assembly is serviceable in the field due to its sectional design. Even more, the steering wheel assembly reduces material scrap rates in the manufacturing process, and removes extended cure times associated with prior steering wheel assemblies wherein an initial resin layer covers the entirety of the armature. This all leads to faster manufacturing, lower scrap rates, and ease of service and partial replacement.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of manufacturing a steering wheel assembly comprising the steps of:
    forming a plurality of inner layer sections;
    molding an intermediate layer onto each of said plurality of inner layer sections;
    covering said intermediate layer of each of said plurality of inner layer sections; and
    securing each of said plurality of inner layer sections adjacent a corresponding inner layer section of said plurality of inner layer sections, and around an armature.

2. The method of manufacturing a steering wheel assembly of claim 1, wherein said armature includes a hub, a rim, and at least two spokes connecting said hub and said rim.

3. The method of manufacturing a steering wheel assembly of claim 1, wherein the securing step includes interlocking said corresponding inner layer sections together around said armature.

4. The method of manufacturing a steering wheel assembly of claim 1, wherein said intermediate layer is a polyurethane.

5. The method of manufacturing a steering wheel assembly of claim 1, wherein the interlocking step includes positioning fasteners along said inner layer to align and lock said inner layer sections together around said armature.

* * * * *